United States Patent [19]

Tugal et al.

[11] Patent Number: 4,835,972

[45] Date of Patent: Jun. 6, 1989

[54] FLEX-LINE VIBRATION ISOLATOR AND CRYOPUMP WITH VIBRATION ISOLATION

[75] Inventors: Halil Tugal, Windham, N.H.; Peter W. Gaudet, Chelmsford, Mass.

[73] Assignee: Helix Technology Corporation, Waltham, Mass.

[21] Appl. No.: 931,432

[22] Filed: Nov. 14, 1986

Related U.S. Application Data

[63] Continuation-in-part of Ser. No. 839,693, Mar. 13, 1986, abandoned.

[51] Int. Cl.[4] .............................................. F17C 7/02
[52] U.S. Cl. ...................................... 62/50.1; 62/55.5; 138/149; 181/207; 285/49
[58] Field of Search .................... 62/55.5, 55; 138/149; 181/207; 285/49

[56] References Cited

U.S. PATENT DOCUMENTS

| | | | |
|---|---|---|---|
| 2,386,505 | 10/1945 | Puchy | 248/638 |
| 3,125,858 | 3/1964 | Baittinger | 138/149 |
| 3,345,245 | 10/1967 | Hanusa | 138/149 |
| 3,369,826 | 2/1968 | Boosey et al. | 138/149 |
| 3,894,403 | 7/1975 | Longsworth | 62/55 |
| 3,952,777 | 4/1976 | Uhlig | 138/149 |
| 4,050,665 | 9/1977 | Matthews et al. | 248/638 |
| 4,352,643 | 10/1982 | Iijima | 417/363 |
| 4,363,217 | 12/1982 | Venuti | 62/55.5 |
| 4,394,819 | 7/1983 | Averill | 62/295 |
| 4,526,015 | 7/1985 | Laskaris | 62/514 R |
| 4,539,822 | 9/1985 | Sundquist | 62/55.5 |

OTHER PUBLICATIONS

"Use of Vibration-Isolated Cryopumps to Improve Electron Microscopes and Electron Beam Lithography Units", *J. Vac. Sci. Technol.*, A 1(2), pp. 237-240, Apr.-Jun. 1983.

National Electrostatics Corp., "Vibration Isolator for Cryopumps and Turbomolecular Pumps", Brochure.

Leybold-Heraeus Vacuum Products Inc., 1983-1984 Catalog, 4.26.

Balzers 1983-1985 Catalog, D28, D20, D21.

B. D. Vinogradov and V. V. Chernoberevskii, "Damping of Tubes by a Constrained Coating", *Sov. Phys. Acoust.*, 26(4), pp. 329-330, Jul.-Aug. 1980.

R. Z. Zeinetdinov et al., "Vibration Damping of Tubes by Vibration-Absorbing Coatings", *Sov. Phys. Acoust.*, 26(4), pp. 312-314, Jul.-Aug. 1980.

*Primary Examiner*—Ronald C. Capossela
*Attorney, Agent, or Firm*—Hamilton, Brook, Smith & Reynolds

[57] ABSTRACT

A vibration isolator particularly suited to isolating a closed cycle refrigerator in a cryopump includes a bellows having o-rings made of vibration damping material secured between the corragations of the bellows. A soft damping material maintains a low spring constant and also dampens all frequencies transmitted into the isolator.

17 Claims, 6 Drawing Sheets

FLEX-LINE VIBRATION ISOLATOR AND CRYOPUMP WITH VIBRATION ISOLATION

DESCRIPTION

This is a continuation-in-part of U.S. application Ser. No. 839,693 filed Mar. 13, 1986 by Halil Tugal and Peter W. Guadet now abandoned. A related application, which is a continuation-in-part of Ser. No. 839,693, is also filed on even date herewith by Halil Tugal.

BACKGROUND

Cryogenic vacuum pumps, or cryopumps, cooled by closed cycle refrigerators have gained wide acceptance in recent years for high vacuum applications. A cryopump typically includes a vacuum vessel, enclosing a cryopump chamber, which can be mounted to a work chamber which is to be evacuated. A cryogenic refrigerator is mounted to the vacuum vessel and a cold finger of the refrigerator extends into the vessel. The refrigerator typically operates on the Gifford-MacMahon cycle. High pressure refrigerant gas, such as helium, is introduced into the cold finger and there displaced and expanded by movement of a reciprocating displacer/regenerator. Cryopanels mounted to the cold finger within the cryopump chamber are cooled to cryogenic temperatures. Gases from the work chamber condense on those cryopanels and, with the gases thus removed from the work chamber, its pressure is reduced to a high vacuum in the order of $10^{-7}$ torr.

Because a cryopump is a capture system in which no moving parts are exposed to the vacuum environment, it is extremely clean. Cryopumps are also fast and efficient. Cryopumps cooled by closed cycle refrigerators are particularly convenient and economical because there is no need for an expendible cryogen such as liquid nitrogen. The refrigeration is developed in the cold finger which protrudes into the vacuum vessel. Cryopumps driven by closed cycle refrigerators have suffered one disadvantage which has made such cryopumps unsuitable for certain applications. In such applications as electron microscopes and electron beam lithography, vibrations generated in a closed cycle refrigerator can be detrimental In a conventional cryopump, the closed cycle refrigerator is mounted directly to the cryopump vacuum vessel. To minimize the vibration translated to the work chamber, systems have been proposed in which the refrigerator is vibration isolated from the work chamber. The vibration isolator may be positioned between the cryopump chamber and the work chamber or between the closed cycle refrigerator and the cryopump chamber. In order to provide for relative movement between the vibrating refrigerator and the work chamber, while still providing a vacuum seal between the refrigerator and the work chamber, a bellows is utilized. The bellows may surround the flow path between the cryopump chamber and the work chamber or it may surround the cold finger of the cryogenic refrigerator.

One form of isolator has been described by Guy S. Venuti in U.S. Pat. No. 4,363,217 and in "Use of Vibration Isolated Cryopumps to Improve Electron Microscopes and Electron Beam Lithography Units", *Journal of Vacuum Science Technology,* A1 (2) April–June 1983, pages 237–240. The closed cycle refrigerator is suspended from the cryopump chamber by the bellows, and the bellows serve as an isolating spring. As a vacuum is created in the cryopump chamber, the difference in pressure, between the vacuum and ambient pressure, across the bellows tends to collapse the bellows. Collapse of the bellows is prevented by the suspended weight of the refrigerator and an additional mass mounted to the refrigerator. In such a system, the spring action of the bellows isolates the cryopump chamber from refrigerator vibration frequencies above a resonant frequency. Below the resonant frequency there is no isolation, and at the resonant frequency vibrations are actually amplified. By selection of the spring constant of the bellows and the mass suspended by the bellows, the isolator system can be designed to have a resonant frequency below the most significant vibration frequencies and thus effectively isolate the refrigerator from the work chamber. A primary deficiency of the Venuti system is that it requires the additional cumbersome mass. Further, that mass acts to stretch the bellows out when there is no vacuum in the vacuum chamber, so the refrigerator must have added support. Also, the system is only suited to cryopumps mounted below a work chamber.

In another form of vibration isolator which has been used with both cryopumps and turbomolecular pumps, the bellows is provided for vacuum sealing, and elastomer vibration isolators are positioned about the bellows between the refrigerator and the work chamber. Such a system relies on isolation and damping of vibration amplitudes by the elastomer isolators which also prevent collapse of the bellows. An example can be found in U.S. Pat. No. 4,539,822 to Sundquist. In a similar system, an elastomeric ring surrounds the bellows. A metal band around the elastomeric isolator ring prevents the collapse of the bellows and the cryopump vessel under vacuum. The elastomeric isolator ring provides both vibration isolation and damping of vibration amplitudes.

DISCLOSURE OF THE INVENTION

In the prior application by Tugal et al., of which this is a continuation in part application, damping material is position about a cryopump to attenuate vibration. In accordance with the present invention, vibration is attenuated by securing o-rings between the corrugations of the bellows of the isolator positioned about the cryopump and of flexible pressure lines feeding gas into and out of cryopump It is preferred that the flexible pressure lines further comprise an isolator connected in series with the line. Preferably, the isolator has bellows with corrugations and vibration damping material filling the spaces between the corrugations of the bellows and surrounding the bellows.

To increase attenuation of vibration along the flexible pressure line it is preferred that the isolator is adjacent to the cryopump to dampen any vibration traveling along the line. It is further preferred that the isolator have an inner diameter which is larger than or equal to that than that of the pressure line. A flexible pressure line having an isolator with a larger size diameter realizes a greater reduction of axial vibration caused by the gas flowing through the line.

BRIEF DESCRIPTION OF THE DRAWINGS

The foregoing and other objects, features, and advantages of the invention will be apparent from the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF PREFERRED EMBODIMENTS

The cryopump of each of the figures comprises a vacuum vessel 12 which is to be mounted to the wall of a work chamber along a flange 14. A front opening 16 in the vessel 12 communicates with a circular opening in a work chamber. Alternatively, the cryopump assembly may protrude into the chamber and a vacuum seal be made at a rear flange. A two stage cold finger 18 of a refrigerator protrudes into the vessel 12 through an opening 20. In this case, the refrigerator is a Gifford-MacMahon refrigerator such as disclosed in U.S. Pat. No. 3,218,815 to Chellis et al., but others may be used. A two stage displacer in the cold finger 18 is driven by a motor 22. With each cycle, helium gas introduced into the cold finger under pressure through a flexible pressure feed line 24 is expanded and thus cooled and then exhausted through a flexible pressure return line 26. A first stage heat sink, or heat station, 28 is mounted at the cold end of the first stage 29 of the refrigerator. Similarly, a heat sink 30 is mounted to the cold end of the second stage 32.

The primary pumping surface is, in this system, an inverted cup 34 mounted to the heat sink 30. A low temperature adsorbent 36 such as charcoal particles is epoxied to the inside surface area of the cup.

A cup shaped radiation shield 44 is mounted to the first stage, high temperature sink 28. The second stage of the cold finger extends through an opening 45 in that radiation shield. This radiation shield 44 surrounds the second stage array to the rear and sides to minimize heating of the array by radiation. Preferably the temperature of this radiation shield is less than about 120 K.

A frontal cryopanel array 46 serves as both a radiation shield for the primary cryopanel and as a cryopumping surface for higher boiling temperature gases such as water vapor. This array comprises louvers 48 joined by spokes 50. The frontal array 46 is mounted to the radiation shield 44, and the shield both supports the frontal array and serves as the thermal path from the heat sink 28 to that array.

Figure 1:
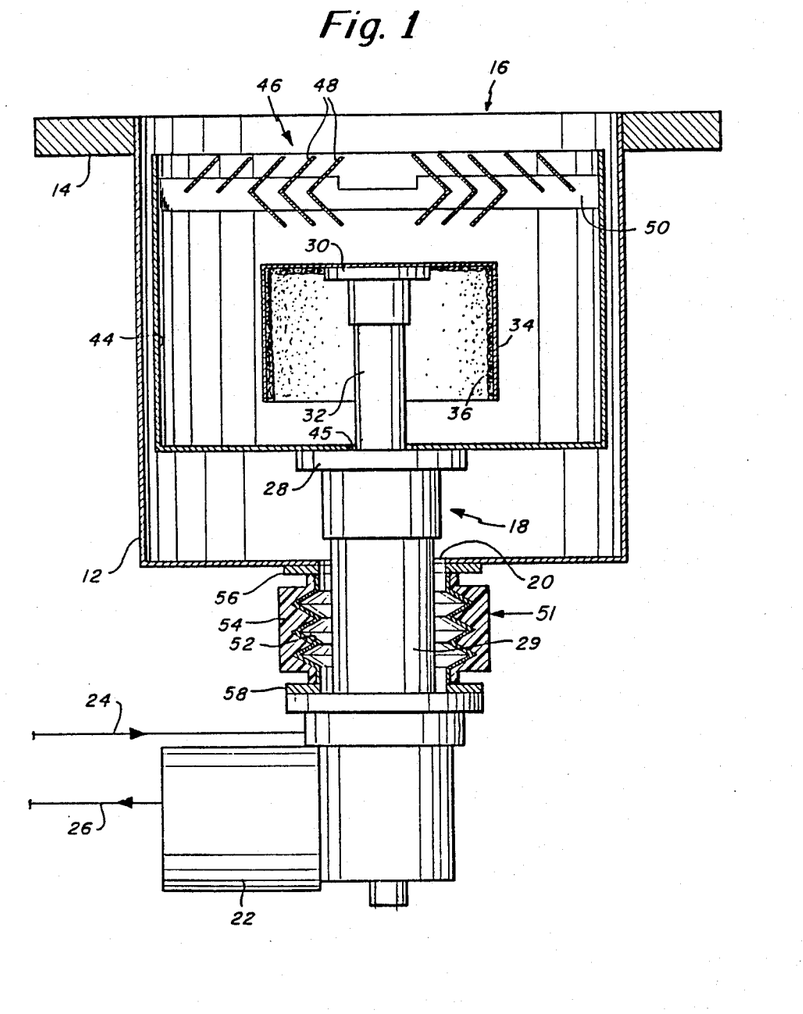
FIG. 1 is a longitudinal partial cross sectional view of a cryopump provided with a welded bellows isolator between the refrigerator and the cryopump chamber.

In a conventional cryopump, the refrigerator is connected directly to the vacuum vessel 12. In the system of FIG. 1, however, the refrigerator is mounted to the vessel through a vibration isolator 51. The vibration isolator 51 includes a bellows 52 which in FIG. 1 is a welded diaphragm bellows. Vibration damping material 54 is integrally formed with the bellows to fill the outer spaces between the corrugations of the bellows and to cover the bellows. The bellows is welded at each end to flanges 56 and 58 which allow it to be coupled into the system.

For vacuum applications the bellows should be stainless steel of thickness between 0.008 inch and 0.012 inch. Silicon rubbers such as methyl phenyl are particularly suited as the damping material because they can be poured about the bellows in liquid form and then cured.

The stainless steel of which the bellows is formed has a dynamic shear modulus of about $1 \times 10^{12}$ dynes/cm$^2$. Thus, there is little change in dimension, that is strain, of the metal with a given amount of stress. Despite the high dynamic modulus, the corrugated shape of the thin metal results in a relatively low spring constant of the bellows assembly. The bellows configuration does permit significant changing length of the bellows assembly along its axis, but the circumferential length through each cross section of the bellows is maintained constant due to the high dynamic modulus of the metal. Thus, the bellows is free to change in axial length but does not bow inwardly or outwardly with changes in pressure acting radially on the bellows and with collapsing of the bellows.

The damping material 54, on the other hand, is of a synthetic rubber which has a high damping factor, preferably around one, and a relatively low dynamic shear modulus, preferably less than $5 \times 10^6$ dynes/cm$^2$. It, therefore, has a low spring constant regardless of its shape. The material filling the spaces between the bellows corrugations and surrounding the bellows is able to prevent collapse of the bellows when a vacuum is drawn in the vacuum chamber while maintaining the desirable low spring constant. On the other hand, because the bellows is impermeable to gas, the rubber is not subjected to significant radial pressure differentials which might otherwise result in bowing of the damping material.

To prevent wrinkling of the bellows with pressure differentials across the thin metal, it is best that the rubber damping material be securely bonded to the metal continuously along the interface between the two. To that end, it is best to provide an epoxy layer between the metal bellows and the rubber damping material. The epoxy ensures that the rubber is held against the bellows so that it is not squeezed away from the bellows with axial compression of the assembly.

Advantages of the present isolator are its compactness and the simplicity of its assembly into the cryopump. The isolator does not include multiple isolators which must be bolted onto flanges as in the Sundquist system or a bulging elastomer held in place by a metal ring.

Another significant advantage of the present isolator is that it provides damping of all frequencies transmitted into the isolator. In prior isolators in which the elastomeric isolator was separate from the bellows, some vibrations could be transmitted through the bellows with minimal damping. With the damping material integral with the bellows, those vibrations are likely to be absorbed by the damping material. Further, some vibrations transmitted along the bellows follow a path through alternating layers of metal and rubber. Thus, to some extent, the isolator provides the improved damping of constrained layer damping. Because of the radial structural rigidity provided by the bellows, little radial rigidity is required of the rubber material, so a soft thin damping layer can be used.

The typical vibrations produced by a cryopump have both a low frequency component and a high frequency component. The piston stroke of a typical cryopump provides low frequency vibrations, while the high frequency components are due to the vibrations of the stepper motor of the refrigerator and due to the vibrations of the vacuum chamber. The present isolator, as in the case of many typical isolators, can be modeled as a spring-mass system having a spring "constant" and a damping factor dependent on frequency and temperature. In such vibration isolating models the resonant frequency is determined by the relationship $$f_o = (\tfrac{1}{2}) \sqrt{kg/W}$$

where k is the spring constant of the cryopump isolator system, g is acceleration due to gravity, and W is the total force acting on the isolator taking into consideration both the vacuum force and the weight of the cryopump. Any vibration isolating spring scheme has a vibration transmissibility of greater than one for a given resonant frequency $f_o$. Such a system has a lower transmissibility below and above that resonant frequency. Usually vibration frequencies above $2 f_o$ are attenuated (transmissibility is less than 1) while below $2 f_o$ frequency vibration levels are amplified (transmissibility is greater than one). The transmissibility amplitude is determined by the damping factor. High damping factors lower the amplitude at frequencies below $2 f_o$; but the higher damping factor increases the transmissibility above $2 f_o$ relative to a lighter damped system, even though the transmissibility is still less than one. The low frequency components of cryopump vibrations do not need be greatly reduced, so they can be attenuated easily via high-damping rubberlike material, and they are much lower in frequency than the resonant frequency of the vibration isolator so as not to be sampliﬁed by the isolator. The high frequency vibration components are well above the resonant frequency and are easily attenuated by the isolator.

The damping material can be of low damping or high damping rubberlike material. The low damping rubberlike materials at room temperatures exhibit low damping factors and provide better isolation where high frequency vibrations are of primary concern. Higher damping materials typically provide better results where lower frequencies near the resonant frequency are a primary concern. As examples, neoprene rubber, natural rubber, SBR rubber (75/25 butadiene-styrene) are filled natural rubber (50 parts by weight of HAF carbon black) exhibit shear moduli and damping factor that vary by a factor of two in the frequency range of 1 Hz to 10,000 Hz. at 35° C. On the other hand, the high-damping rubberlike materials like plasticized polyvinyl butyral resin, thiokol Rd, plasticized polyvinyl acetate and filled butyl rubber (40 parts by weight of MPC carbon black) possess dynamic moduli that increase very rapidly with frequency, and the damping factor is large and again may vary relatively slowly with frequency.

Figure 2:
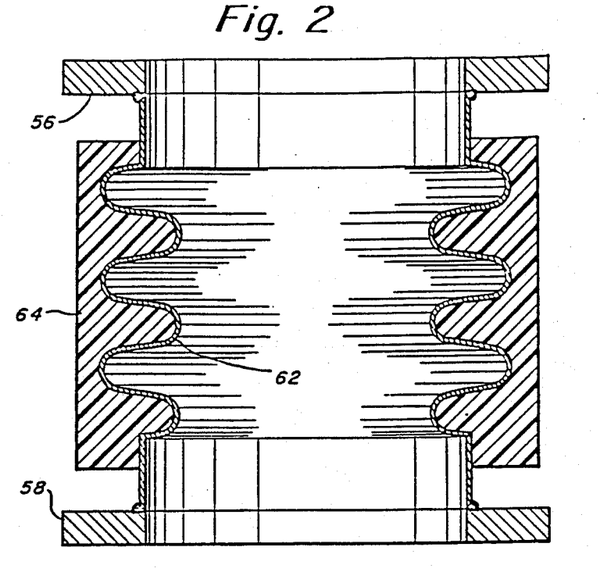
FIG. 2 is an enlarged longitudinal cross sectional view of an alternative convoluted bellows isolator.
Figure 3:
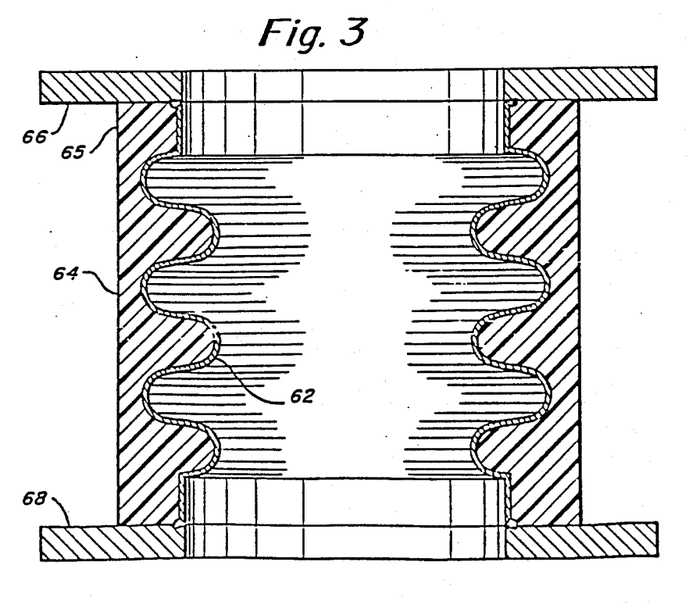
FIG. 3 is a longitudinal sectional view of another convoluted bellows isolator.

The bellows in the isolator of FIG. 1 is formed of welded diaphragms. Alternative isolators having hydroformed convoluted bellows 62 are shown in FIGS. 2 and 3. As before, the outer spaces between corrugations of the bellows are filled with damping material 64 and the entire assembly is surrounded with damping material. In the embodiments of FIGS. 1 and 2 the damping material is spaced from the end flanges to allow access to flanges of minimum diameter. In the embodiment of FIG. 3, larger diameter flanges 66 and 68 are provided and rubber 65 fills the space between the two end flanges. This approach provides some added damping with some increase in the spring constant of the system.

Figure 4:
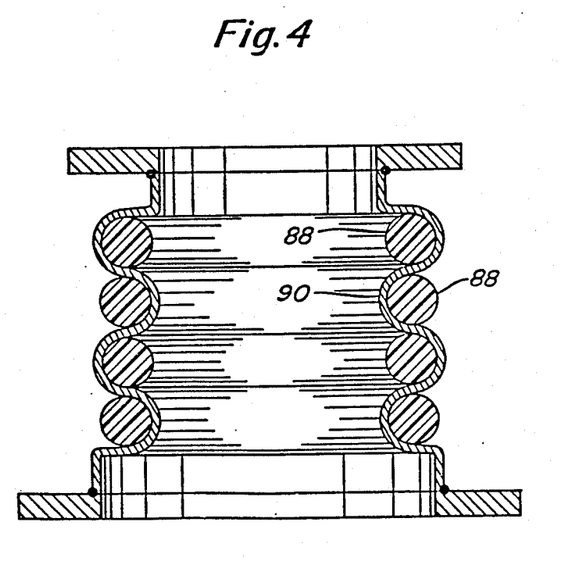
FIG. 4 is a longitudinal partial cross sectional view of an alternative embodiment of the invention.
Figure 5:
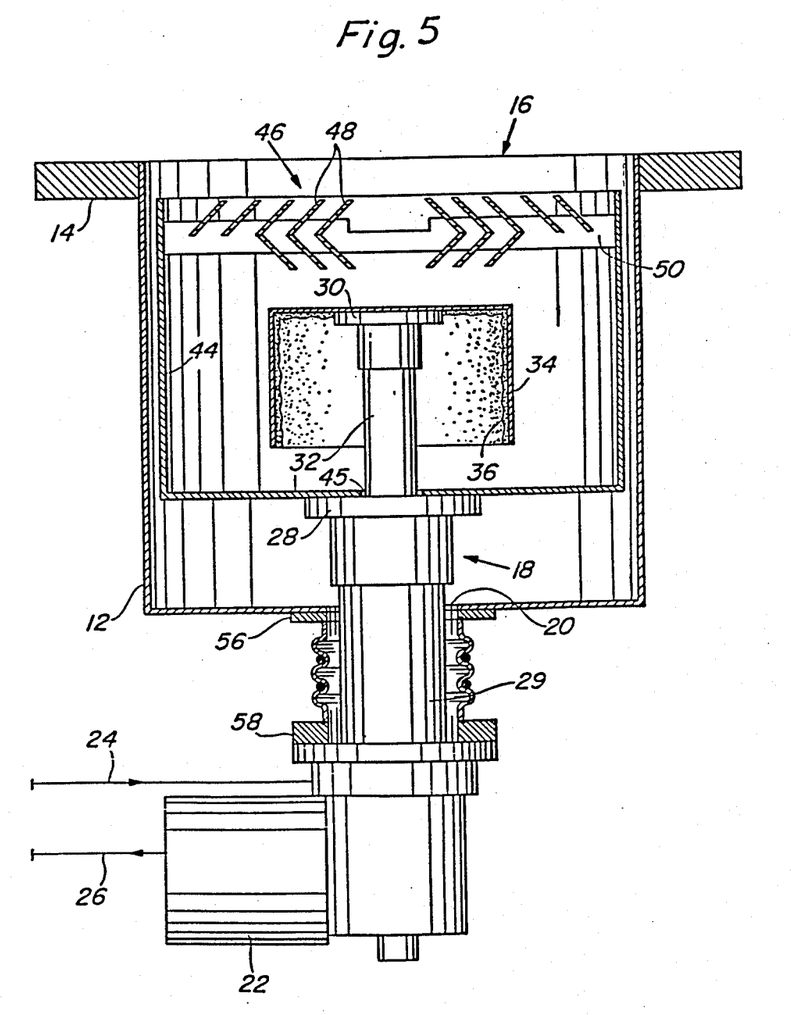
FIG. 5 is a longitudinal cross sectional view of an alternative embodiment of the invention less suited to cryopump applications.

FIG. 4 illustrates an embodiment of the invention which is less suited to vacuum pumps because it includes rubber damping material within the bellows. In this embodiment o-rings 88 are provided in both the inner and outer spaces between the corrugations of the bellows 90. The o-rings serve the same purpose as the molded damping material provided in the previous embodiments. Specifically, the o-rings prevent collapse of the bellows while maintaining a low spring constant of the system and also provide damping of vibrations transmitted along the bellows. This embodiment is less suited to cryopump applications because a soft rubber is more likely to outgas into the vacuum environment. The o-rings inside the bellows can be omitted but, without rubber either within or covering alternate corrugations, some of the corrugations might collapse under vacuum conditions. To prevent the collapse of these corrugations, weights may be added. FIG. 5 shows such a system employing o-rings and a weighted flange.

Figure 6:
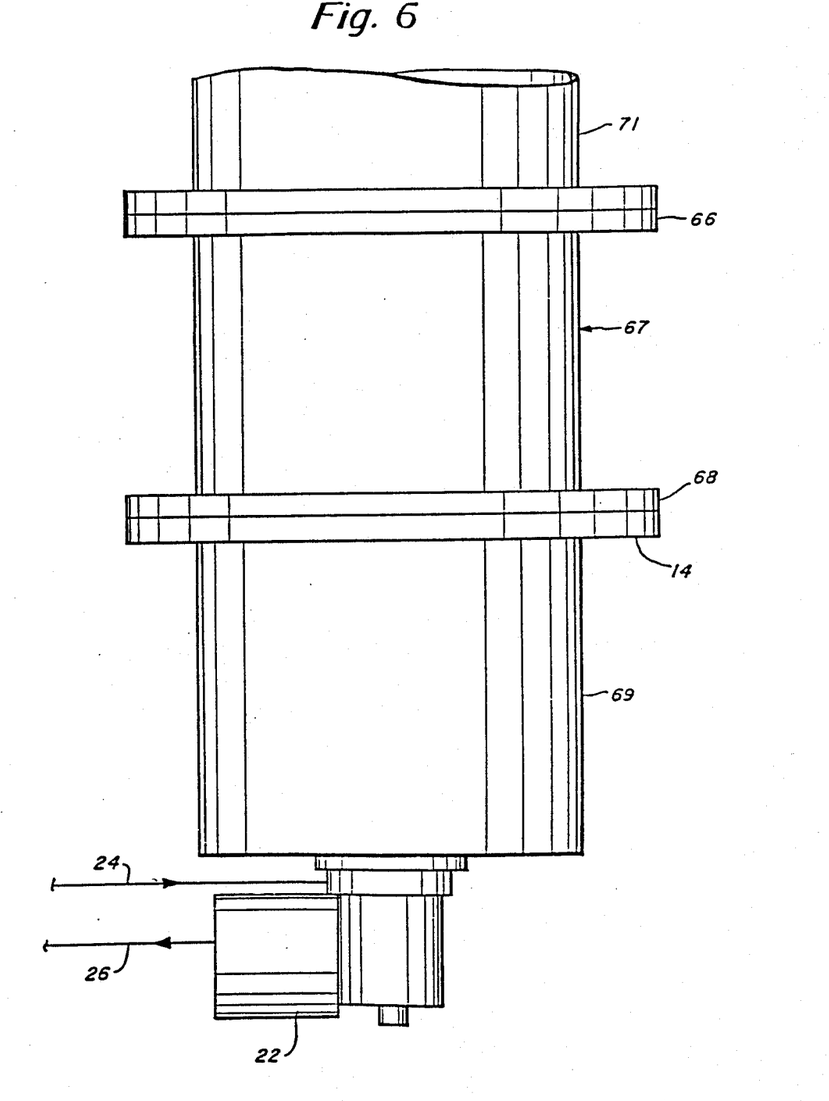
FIG. 6 is a side view of an isolator positioned between the cryopump chamber and the work chamber.

An alternative embodiment of the invention is shown in FIG. 6. In this case, the isolator 67 is positioned between the cryopump vacuum vessel 69 and the work chamber 71. The bellows is required to provide the gas flow path from the work chamber to the cryopump chamber. Such positioning of the vibration isolator is suitable for isolating the work chamber from the refrigerator of smaller cryopumps but becomes cumbersome with large diameter cryopumps.

In addition to the above embodiments, flexible pressure lines 24 and 26 which transport helium gas to and from the refrigerator can be equipped with a vibration isolator described above. The advantage of placing isolators on these lines is that any vibration translated to the refrigerator via these lines can be minimized, thus reducing the overall vibration which is ultimately translated from the cryopump to the work chamber.

Conventionally, the flexible pressure lines used in cryopump systems are seamless metal tubes having thin wall bellows. Wrapped around each tube is a tough, flexible metal-braided sleeve. These pressure lines are preferred over solid tubes because they avoid alignment problems and because they offer some attenuation of vibration translated to the refrigerator. The attenuation, however, is slight because of their metal construction.

Figure 7:
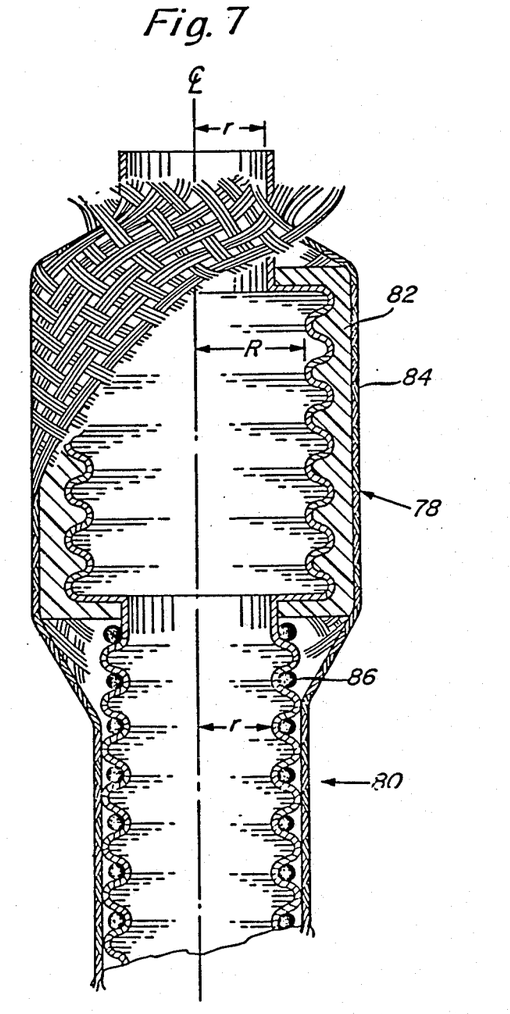
FIG. 7 is a longitudinal partial cross sectional view of a flexible pressure line embodying a vibration isolator.

FIG. 7 shows the present embodiment. As shown, a vibration isolator 78 is placed in series with a flexible pressure line 80. Damping material 82, described above, fills between corrugations of the bellows and surrounds the bellows assembly. As before, the damping material between the bellows corrugations prevents the isolator from collapsing when there is a vacuum inside the line and also serves to absorb energy that is transmitted along the bellows. The bellows may be formed from the same material as the seamless tube pressure line 80 adjacent to it. Wrapped around the isolator 78 and the pressure line 80 is a metal-braided sleeve 84 as used in conventional lines. O-rings 86 may be placed circumferentially along the pressure line and securely against the outside bellows formed in the pressure line to provide added damping. Preferably the O-rings are made of damping material described above.

In the preferred embodiment the isolator has a larger inside diameter R than the pressure line diameter r. This offers several advantages over conventional pressure lines. In addition to attenuating vibration by the isolator, as discussed above, a pressure line having an insulator with a larger diameter than the flexible pressure line realizes a reduction of axial vibration caused by the gas flowing through the line. Damping results because the velocity of gas is decreased with the increased cross sectional area of the isolator. The isolator may have the same inner diameter as that of the flexible pressure line, but preferably not smaller. O-rings securely fit to the pressure line further provide the advantage of absorbing energy while still allowing flexibility. In light of these advantages it is preferred that an isolator be placed at the end of the line closest to the cryopump in order to dampen any vibration traveling along the line.

While the invention has been particularly shown and described with reference to a preferred embodiment thereof, it will be understood by those skilled in the art that various changes in form and details may be made therein without departing from the spirit and scope of the invention, as defined by the appended claims. For instance, it should be apparent that vibration isolators in accordance with the present invention can be useful in applications other than isolation of cryopumps and their application to other vacuum pumps. Also, the design of the isolator may depend on the desired vibration isolation. For example, increasing the length of the isolator will lower the frequencies that will be attenuated.

We claim:

1. A cryopump adapted to be mounted to a chamber to be evacuated, the cryopump comprising:
   a vacuum vessel;
   a refrigerator having a cold finger extending through the vacuum vessel and connected to cryopanels at which gas is condensed;
   a motor for driving the refrigerator; and,
   vibration isolated pressure lines for introducing and exhausting helium gas into and out of the cold finger, the vibration isolated pressure lines comprising bellows having corrugations and damping material secured to the corrugations of the bellows for absorbing vibrations transmitted through the bellows.

2. A cryopump as claimed in claim 1 further comprising a vibration isolator mounted between the refrigerator and the vacuum vessel.

3. A cryopump as claimed in claim 2 wherein o-rings made from vibration damping material are secured between the exterior corrugations of the bellows.

4. A cryopump as claimed in claim 1 further comprising a vibration isolator mounted between the chamber and the vacuum vessel.

5. A cryopump as claimed in claim 1 having vibrations isolated pressure lines, the pressure lines further comprising:
   a flexible pressure line having corrugations filled with o-rings made of damping material secured therein; and
   an isolator having circumferential bellows and a vibrating damping material secured to the outer surface of the bellows and connected in series with the pressure line.

6. A cryopump adapted to be mounted to a chamber to be evacuated, the cryopump comprising:
   cryopanels;
   a refrigerator for cooling the cryopanels to cryogenic temperatures at which gases condense on the cryopanels; and,
   a vibration isolator between the refrigerator and the chamber, the vibration isolator comprising a bellows for mechanically isolating the refrigerator from the chamber while maintaining a gas seal between the chamber and refrigerator and o-rings made from vibration damping material secured between corrugations of the bellows to prevent collapse of the bellows and damp vibration transmitted through the bellows.

7. A cryopump as claimed in claim 6 wherein the bellows is a formed convoluted bellows.

8. A cryopump as claimed in claim 6 wherein the bellows is a welded bellows.

9. A flexible pressure line for conducting fluid comprising: a conduit for conducting fluid, said conduit comprising:
   a cylindrical bellows having circumferential corrugations; and
   vibration damping material filling spaces between the corrugations of the bellows to dampen vibrations transmitted through the bellows.

10. A flexible pressure line as claimed in claim 9 wherein o-rings formed of vibration damping material is secured between the corrugations of the bellows.

11. A flexible pressure line as claimed in claim 9 wherein vibration damping material covers the bellows.

12. A flexible pressure line for conducting fluid comprising: a conduit for conducting fluid, said conduit comprising:
    a cylindrical bellows having circumferential corrugations; and
    o-rings made of vibration damping material filling spaces between the corrugations of the bellows to dampen vibrations transmitted through the bellows.

13. A flexible pressure line as claimed in claim 12 further comprising an isolator connected in series with the flexible pressure line, the isolator having bellows with corrugations and damping material filling the corrugations and surrounding the bellows.

14. A flexible pressure line for conducting fluid comprising; a conduit for conducting fluid, said conduit comprising:
    a pressure line having bellows with corrugations;
    an isolator having bellows with corrugations connected in series with the pressure line; and
    vibration damping material filling spaces between the corrugations of the bellows along the isolator to dampen vibrations transmitted through the bellows.

15. A flexible pressure line as claimed in claim 14 wherein o-rings made of vibration damping material fill the spaces between the corrugations of the bellows along the pressure line.

16. A flexible pressure line as claimed in claim 14 wherein further comprising vibration damping material which covers the bellows along the isolator.

17. A flexible pressure line as claimed in claim 14 wherein the inner diameter of the isolator is greater than or equal to the diameter of the pressure line along the axial length of the flexible pressure line.

* * * * *